(12) United States Patent
Pant et al.

(10) Patent No.: US 12,486,263 B2
(45) Date of Patent: Dec. 2, 2025

(54) METHOD FOR THE PREPARATION OF N-MONOFLUOROALKYL TROPANES AND THEIR USE

(71) Applicant: ROTOP RADIOPHARMACY GMBH, Dresden (DE)

(72) Inventors: Kritee Pant, Dresden (DE); Felix Roschke, Dresden (DE)

(73) Assignee: ROTOP RADIOPHARMACY GMBH, Dresden (DE)

( * ) Notice: Subject to any disclaimer, the term of this patent is extended or adjusted under 35 U.S.C. 154(b) by 716 days.

(21) Appl. No.: 17/759,336

(22) PCT Filed: Jan. 22, 2021

(86) PCT No.: PCT/EP2021/051439
§ 371 (c)(1),
(2) Date: Jul. 22, 2022

(87) PCT Pub. No.: WO2021/148598
PCT Pub. Date: Jul. 29, 2021

(65) Prior Publication Data
US 2023/0089353 A1    Mar. 23, 2023

(30) Foreign Application Priority Data
Jan. 24, 2020   (EP) .................................... 20153634

(51) Int. Cl.
C07D 451/02   (2006.01)
A61K 51/04    (2006.01)
C07D 451/06   (2006.01)
C07F 7/22     (2006.01)

(52) U.S. Cl.
CPC ........ C07D 451/02 (2013.01); A61K 51/0455 (2013.01); C07D 451/06 (2013.01); C07F 7/2208 (2013.01); C07B 2200/05 (2013.01); C07B 2200/07 (2013.01)

(58) Field of Classification Search
CPC .. C07D 451/02; C07D 451/06; C07D 451/08; A61K 51/0455; C07F 7/2208; C07B 2200/05; C07B 2200/07
USPC ...................................................... 424/1.85
See application file for complete search history.

(56) References Cited

FOREIGN PATENT DOCUMENTS

| EP | 0703791 B1 | 12/2002 |
| EP | 0988263 B1 | 12/2004 |
| WO | 2011/073256 A1 | 6/2011 |

OTHER PUBLICATIONS

Majewski et al. Tetrahedron Lett. 1994, 35, 3653-3656. (Year: 1994).*

International Search Report and Written Opinion for PCT/EP2021/051439, mailed Mar. 26, 2021.
Rami-Mark et al., "Synthesis, radiosynthesis and first in vitro evaluation of novel PET-tracers for the dopamine transporter: [$^{11}$C]IPCIT and [$^{18}$F]FE@IPCIT", Bioorganic & Medicinal Chemistry : A Tetrahedron Publication For The Rapid Dissemination of Full Original Research Papers and Critical Reviews on Biomolecular Chemistry, Medicinal Chemistry and Related Disciplines, Elsevier, NL, vol. 21, No. 24, Nov. 7, 2013 (Nov. 7, 2013), p. 7562-7569.
Gu et al., "Synthesis and Biological Evaluation of a Series of Novel N- or O-Fluoroalkyl Derivatives of Tropane: Potential Positron Emission Tomography (PET) Imaging Agents for the Dopamine Transporter", Bioorganic & Medicinal Chemistry Letters, vol. 11, No. 23, Dec. 1, 2001 (Dec. 1, 2001), p. 3049-3053.
Thompson et al., "Fmoc-protected Tropane-based Amino Acids for Peptide Structure-Function Studies", Tetrahedron Letters, Elsevier Ltd, Amsterdam, NL, vol. 38, No. 16, Apr. 21, 1997 (Apr. 21, 1997), p. 2907-2910.
Neumeyer et al., "N-Omega-Fluoroalkyl Analogs of (Ir)-2beta-Carbomethoxy-3beta-(4-Iodophenyl)-Tropane Nbeta-Cit): Radiotracers For Positron Emission Tomography and Single Photon Emission Computed Tomography Imaging of Dopamine Transporters", Journal of Medicinal Chemistry, American Chemical Society, US, vol. 37, No. 11, Jan. 1, 1994 (Jan. 1, 1994), p. 1558-1561.
Chen et al., Synthesis, Characterization and in Vivo Evaluation of (N-((E)-4-[$^{18}$f]Fluorobut-2-En-L-YL)-2b-Carbomethoxy-3b-(4-Substituted-phenyl) Nortropanes For Imaging Dat By Pet, J. Labelled Cpd. Radiopharm. 42, Suppl. 1 (1999), pp. S400-S402.
Findlay, "Concerning 2-Carbomethoxytropinone", 2-Carbomethoxytropinone, Nov. 1957, pp. 1385-1394, vol. 22, Contribution from the National Institute of Arthritis and Metabolic Diseases, National Institutes of Health, Public Health Service, U.S. Department of Health, Education and Welfare.
Carroll et al., "Synthesis and Ligand Binding of Cocaine Isomers at the Cocaine Receptor", Journal of Medicinal Chemistry, 1991, vol. 34, No. 3, pp. 883-886.
Meltzer et al."Substituted 3-Phenyltropane Analogs of Cocaine: Synthesis, Inhibition of Binding at Cocaine Recognition Sites, and Positron Emission Tomography Imaging" J. Med. Chem. 36, (1993) pp. 855-862.
Majewski et al., Synthesis of Tropane Alkaloids via Enantioselective Deprotonation of Tropinone. J. Org. Chem. 60, (1995) pp. 5825-5830.

(Continued)

*Primary Examiner* — Michael G. Hartley
*Assistant Examiner* — Sean R Donohue
(74) *Attorney, Agent, or Firm* — HESLIN ROTHENBERG FARLEY & MESITI P.C.

(57) ABSTRACT

The present invention relates to a method for the preparation of an N-monofluoroalkyl tropane, a method for the preparation of a trialkyltin tropane, a method for the preparation of an iodinated and/or radioiodinated tropane and the use of the N-monofluoroalkyl tropane as a precursor in the method for the preparation of the trialkyltin tropane and/or the iodinated and/or radioiodinated tropane.

19 Claims, 7 Drawing Sheets

(56) References Cited

OTHER PUBLICATIONS

Figure 1:
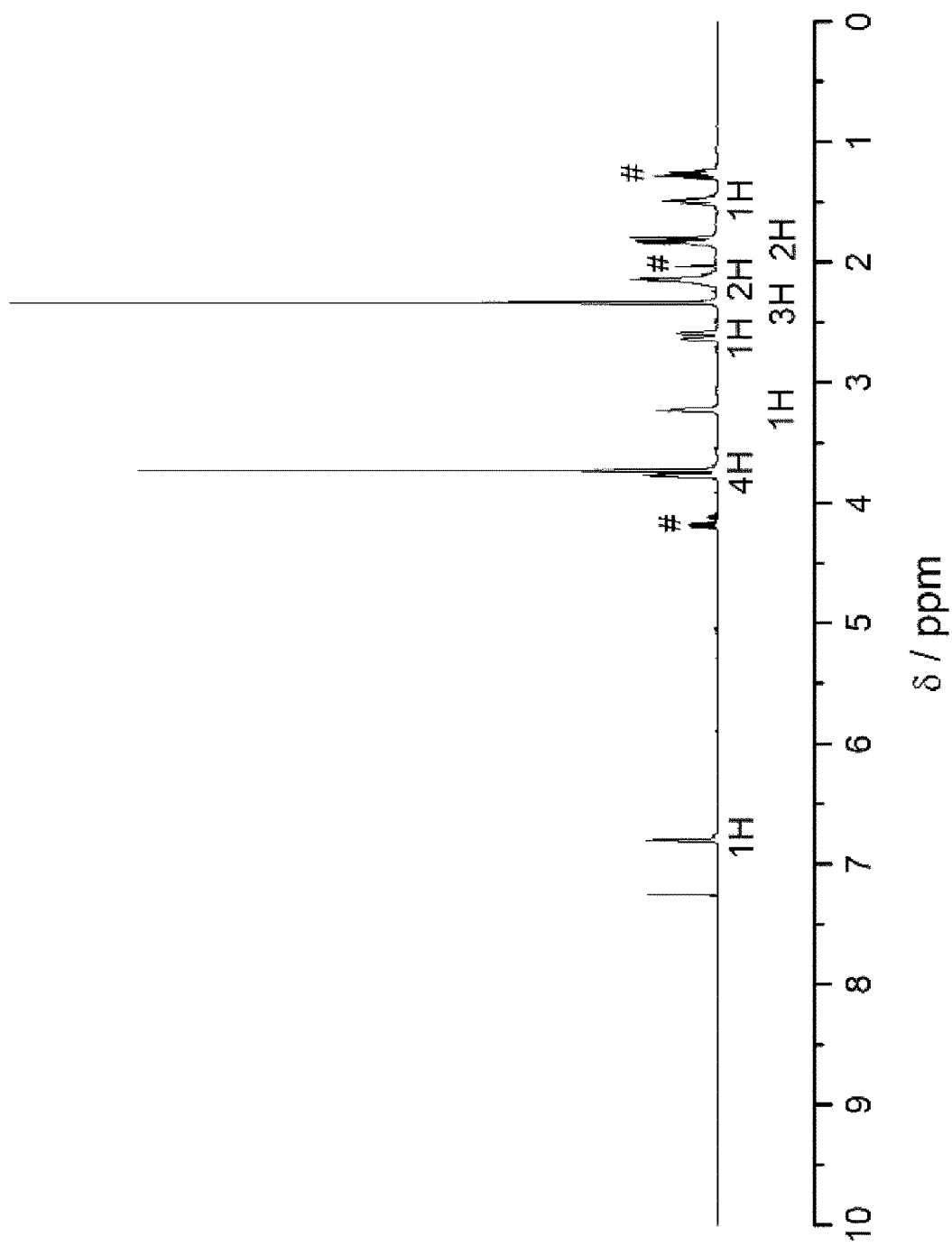

Zou et al., "Novel Tropane-Based Irreversible Ligands for the Dopamine Transporter", J. Med. Chem. (2001) 44, pp. 4453-4461.
Suwijn et al., "The diagnostic accuracy of dopamine transporter SPECT imaging to detect nigrostriatal cell loss in patients with Parkinson's disease or clinically uncertain parkinsonism: a systematic review", EJNMMI Research. (2015) 5:12, pp. 1-8.
Niznik et al., "The Dopamine Transporter is Absent in Parkinsonian Putamen and Reduced in the Caudate Nucleus", J. Neurochem. (1991) vol. 56, pp. 192-198.

* cited by examiner

METHOD FOR THE PREPARATION OF N-MONOFLUOROALKYL TROPANES AND THEIR USE

CROSS REFERENCE TO RELATED APPLICATIONS

This application is a national stage filing under section 371 of International Application No. PCT/EP2021/051439, filed on Jan. 22, 2021, and published on Jul. 29, 2021 as WO 2021/148598, which claims priority to European Application No. 20153634.9, filed on Jan. 24, 2020. The entire contents of WO 2021/148598 are hereby incorporated herein by reference.

The present invention relates to a method for the preparation of an N-monofluoroalkyl tropane, a method for the preparation of a trialkyltin tropane, a method for the preparation of an iodinated and/or radioiodinated tropane and the use of the N-monofluoroalkyl tropane as a precursor in the method for the preparation of the trialkyltin tropane and/or the iodinated and/or radioiodinated tropane.

Parkinson's disease is a long-term degenerative disorder of the central nervous system that mainly affects the motor system. Diagnostic criteria to ease and standardize the diagnostic process, especially in the early stages of the disease, comprise slowness of movement (bradykinesia) and rigidity, resting tremor or postural instability. Disadvantageously, by movement disorder diagnosis Parkinson's disease is wrongly diagnosed in 6% to 25% of cases (Suwijn et al. 2015).

Alternatively, changes in the density and function of the dopamine transporter have been shown to appear in neurodegenerative and neuropsychiatric diseases such as Parkinson's disease (Niznik et al. 1991). Therefore, the diagnosis of Parkinson's disease can be supported by the metabolic activity of dopamine transporters in the basal ganglia directly measured with positron emission tomography (PET) and single-photon emission computed tomography (SPECT) scans. The dopamine transporter is a membrane-bound protein with 12 putative transmembrane segments located with high densities at the presynaptic dopaminergic nerve terminals.

Commonly, PET-based radiotracers used in the studies of the dopamine transporter abundance and pharmacology are cocaine-derivates, in particular substituted tropanes, labeled with carbon-11 or fluorine-18.

Meltzer et al. describe the synthesis of substituted 3-phenyltropanes, in particular 3β-(3,4-dichlorophenyl) tropane-2β-carboxylic acid methyl ester, and its binding affinity for cocaine recognition sites or their use as PET imaging ligands, respectively (Meltzer et al. 1993).

Carroll et al. disclose a number of cocaine isomers, in particular 3844-substituted phenyl) tropane-2β-carboxylic acid methyl esters, and their binding at the binding site at the dopamine transporter ("cocaine receptor") (Carroll et al. 1991).

Majewski and Lazny describe the synthesis of tropane alkaloids via enantioselective deprotonation of tropinone with chiral lithium amides in the presence of LiCl (Majewski and Lazny 1995).

Zou et al. disclose tropane-based irreversible ligands for the dopamine transporter, in particular substituted 3α-(Diphenylmethoxy)tropane (benztropine) such as 3α-[bis(4'-fluorophenyl)-methoxy]tropane, and their synthesis from cocaine (Zou et al. 2001).

Gu et al. disclose the synthesis of several fluoroalkyl-containing tropane derivatives with high affinity and selectivity for the dopamine transporter and their use for the preparation of $^{18}$F-labeled PET radiotracers (Gu et al. 2001). The fluoroalkyl-containing tropane derivatives are prepared from cocaine. The synthesis includes a dehydration reaction, the introduction of a 4-bromophenyl moiety, an N-demethylation and the alkylation with an alkylation agent of formula F—(CH$_2$)$_n$—Br in the presence of a base to give a N-monofluoroalkyl tropane.

EP 0 703 791 B1 describes iodinated neuroprobes of formula

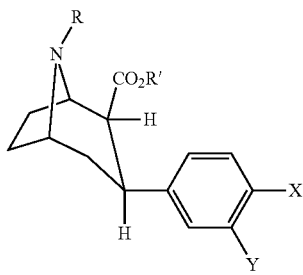

for mapping monoamine reuptake sites, wherein R is a monofluoroalkyl group with $^{18}$F or $^{19}$F, R' is an alkyl group, Y is H and X is an isotope of iodine, preferably 2β-carbomethoxy-3β-(4-iodophenyl)-8-(3-fluoropropyl)-nortropane. Preferably, the isotope of iodine is $^{123}$I or $^{125}$I. Furthermore, EP 0 703 791 B1 describes the trialkyltin compounds as precursors of the iodinated neuroprobes.

EP 0 988 263 B1 describes the production of radioiodinated neuroreceptor agents, wherein trialkyltin precursors of neuroreceptor agents are converted into a radioiodinated neuroreceptor agent by replacing the trialkyltin group of the neuroreceptor agent precursor with a radioactive iodine group, in particular $^{123}$I; in the presence of an oxidation agent, preferably chloramine T; using a pH range which is adjusted with a buffering system with subsequent separation of the radioactively labeled neuroreceptor agent product from by-products with chromatographic separation methods, preferably HPLC; using a non-toxic solvent system comprising ethanol and water.

Furthermore, WO 2011/073256 A1 discloses the preparation of N-monofluoroalkyl tropanes using fluoroalkyl iodides or fluoroalkyl sulfonate esters and their use as precursors for the preparation of the non-radioactive tropane FP-CIT and the $^{123}$I-labelled radiopharmaceutical DaTSCAN™ ($^{123}$I-ioflupane $^{123}$I-FP-CIT).

Rami-Mark et al. describe the synthesis of PET tracers for dopamine transporters starting from cocaine with six reaction steps, including the introduction of a 4-iodphenyl moiety and an N-demethylation (Rami-Mark et al. 2013).

The disadvantage of the disclosed synthesis is the use of cocaine as reagent. As cocaine is subject to narcotics law, it demands high efforts regarding application and monitoring of the narcotics-using methods. Furthermore, the synthesis pathway starting from cocaine requires a more complex synthesis.

Thompson et al. disclose cyclic amino acids containing a tropane backbone, in particular for incorporation into synthetic peptides. The synthesis starts from the compound (R)-2-carbomethoxy-3-tropinone or cocaine (Thompson et al. 1997). Starting from (R)-2-carbomethoxy-3-tropinone, the carbonyl group is reduced to a hydroxyl group and subsequently, a dehydration is carried out. (R)-2-carbomethoxy-3-tropinone is provided by resolution using (+)- and (−)-tartaric acid.

Neumeyer et al. describe radiotracers for PET for imaging the dopamine transporter, in particular N-ω fluoroalkyl analogues of (1R)-2β-carbomethoxy-3β-(4-iodophenyl)-tropane (β-CIT), and the synthesis of trialkyl tin tropane and the radioiodinated tropane starting from (1R)-2β-carbomethoxy-3β-(4-iodophenyl)-tropane (Neumeyer et al. 1994).

The object of the present invention is to provide a novel method for the synthesis of N-monofluoroalkyl tropanes, in particular avoiding the use of cocaine as starting material.

Furthermore, the object of the present invention is to provide a method with reduced synthetic steps.

The object has been solved by a method for the preparation of an N-monofluoroalkyl tropane of formula (VI)

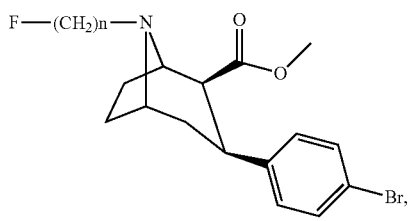
(I)

wherein n is 2, 3 or 4, comprising the steps:
a) provision of a compound of formula (I)

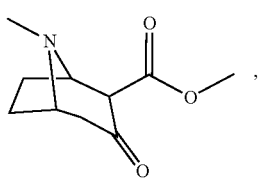
(I)

b) reduction of the carbonyl group to a hydroxyl group to give the compound of formula (II)

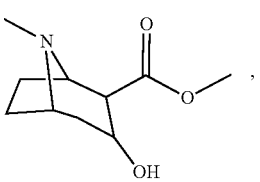
(II)

c) dehydration reaction to give the compound of formula (III)

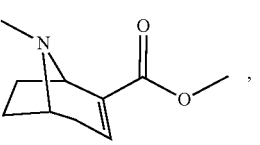
(III)

d) addition of a 4-bromophenyl moiety to give the compound of formula (IV)

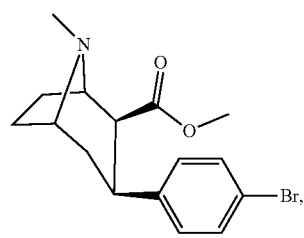
(IV)

e) N-demethylation to give the compound of formula (V)

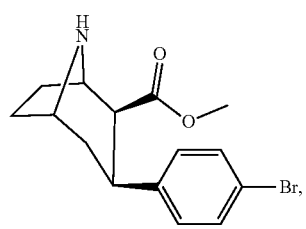
(V)

f) alkylation with an alkylation agent of formula F—(CH$_2$)$_n$—Br in the presence of a base to give the N-monofluoroalkyl tropane of formula (VI),
wherein n is 2, 3 or 4.

According to the invention, the method is carried out in the order of the steps a), b), c), d), e) and f).

Next to the compounds of the present formulae, in particular formulae (I), (II), (Ill), (IV) and (V); all isomers, in particular diastereomers, enantiomers and tautomers of the chemical structures shown; are comprised and the target compound, in particular the desired enantiomer, is shown.

The separation of diastereomers and/or enantiomers takes place after each step or once after step f). Preferably, diastereomers are separated after each step by chromatography. Preferably, the enantiomers are separated once after step f).

Advantageously, the invention provides a method for the preparation of N-monofluoroalkyl tropanes without the use of cocaine. Further advantageously, the preparation of N-monofluoroalkyl tropanes is carried out with reduced synthesis steps, preferably 6 steps. Additionally, the method according to the invention achieves yields of about 8% and thus, is in line with a synthesis starting from cocaine.

Preferably, the N-monofluoroalkyl tropane of formula (VI) prepared by the method according to the invention has a high enantiomeric purity, preferably an enantiomeric purity of at least 99:1, more preferably at least 99.5:0.5. Advantageously, the enantiomeric purity of the N-monofluoroalkyl tropane of formula (VI) is crucial in the use as precursor for the preparation of the radioiodinated tropane of formula (VIII), because this enantiomer shows the highest binding affinity towards the dopamine transporter. Advantageously, the quality, in particular the enantiomeric purity, of the product prepared by the method according to the invention is in line with products synthesized starting from the enantiomeric pure cocaine.

The N-monofluoroalkyl tropane of formula (VI) is more suitable as precursor for the synthesis of the trialkyltin tropane of formula (VII) and/or the iodinated or radioiodinated tropane of formula (VIII) than the corresponding iodide compound due to the higher stability compared to its iodine derivative (VIII).

In embodiments, the compound of formula (I) is provided according to step a) by addition of a carbomethoxy group in 2-position to a 3-tropinone according to formula (Ia)

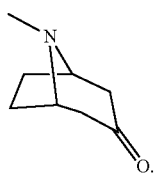
(Ia)

In further embodiments, the carbomethoxylation is carried out using a strong base such as sodium hydride (NaH), lithium diisopropylamide (LDA) or n-butyllithium (n-BuLi) and a carbomethoxy moiety such as dimethyl carbonate or methylcyanoformate ($CH_3OC(O)CN$).

Preferably, the addition of a carbomethoxy group in 2-position is carried out using sodium hydride (NaH) and dimethyl carbonate.

In some embodiments, the carbomethoxylation is catalyzed by methanol.

In further embodiments, the compound of formula (I) is provided according to step a) by using one of the methods described by Findlay (Findlay 1957).

In further embodiments, the compound of formula (I) is provided according to step a) by reaction of succindialdehyde with methylamine and acetonedicarboxylic acid monomethylester.

In embodiments, the reduction of the carbonyl group to a hydroxyl group according to step b) is carried out using at least one reducing agent selected from hydrogen ($H_2$), sodium amalgam/$H_2SO_4$ and hydrides such as sodium borohydride ($NaBH_4$). Preferably, the reducing agent is hydrogen ($H_2$) or $NaBH_4$, more preferably $NaBH_4$. Advantageously, these reducing agents reduce the carbonyl group to a hydroxyl group without the reduction of the ester group.

In further embodiments, the dehydration reaction according to step c) is carried out using a reagent selected from the group comprising phosphoryl chloride ($POCl_3$), hydrochloric acid (HCl), hydrobromic acid (HBr) or 4-Dimethylaminopyridine (DMAP), triethylamine and trifluoroacetic anhydride (TFAA). Notably, in case of $POCl_3$, HCl and HBr a subsequent esterification with methanol is necessary.

Preferably, the dehydration reaction according to step c) is carried out using 4-Dimethylaminopyridine (DMAP), triethylamine and trifluoroacetic anhydride (TFAA) in a one-step procedure.

In embodiments, the addition of a 4-bromophenyl moiety according to step d) is carried out by an organometallic reaction, preferably a Grignard reaction.

As used herein, the term "organometallic reaction" refers to a chemical reaction, wherein an organometallic compound is used in the addition of an organic group, preferably an alkyl, vinyl or aryl group, to another organic molecule by formation of carbon-carbon bonds. As used herein the term "organometallic compound" refers to a compound with at least one chemical bond between a carbon atom of an organic molecule and a metal, preferably alkaline, alkaline earth or transition metals.

As used herein the term "Grignard reaction" refers to an organometallic reaction, wherein alkyl, vinyl or aryl magnesium halides (Grignard reagents) add as nucleophile to an electrophilic group, such as a carbonyl group of an aldehyde or ketone.

In alternative embodiments, the addition of a 4-bromophenyl moiety according to step d) is carried out by arylation of the tropane derivative and further Sandmeyer reaction or $SiMe_3$-Br conversion.

As used herein the term "Sandmeyer reaction" refers to a chemical reaction, in particular a radical-nucleophilic aromatic substitution, whereby copper salts are used.

In further embodiments, the N-demethylation according to step e) is carried out using chloroethyl chloroformates or 2,2,2-Trichloroethoxycarbonyl chloride (TrocCl), Zinc and acetic acid. Preferably, the N-demethylation according to step e) is carried out using chloroethyl chloroformates.

According to the invention, the alkylation with an alkylation agent of formula F—$(CH_2)_n$—Br in step f) is carried out in the presence of a base to give the N-monofluoroalkyl tropane of formula (VI), wherein n is 2, 3 or 4. Preferably, the alkylation is carried out with the alkylation agent 1-bromo-3-fluoropropane of formula F—$(CH_2)_3$—Br.

Most preferably, n is 3.

As used herein, the term "base" refers to a compound, which accepts protons from any proton donor. Suitable bases are known by those skilled in the art. Preferably the base in step f) is potassium carbonate.

In further embodiments, the method according to the invention further comprises one chiral resolution, preferably after the alkylation in step f). Advantageously, the chiral resolution after the alkylation in step f) requires less effort and smaller columns or a smaller stationary phase, respectively. Advantageously, the chiral resolution after the alkylation in step f) results in a reduction of the analytics, in particular the analytics to determine the enantiomeric purity is carried out only after the chiral resolution after step f) instead of after each step.

In further embodiments, the chiral resolution is carried out by high-pressure liquid chromatography (HPLC) using a chiral stationary phase. As used herein, the term "chiral stationary phase" refers to a stationary phase for column chromatography comprising a single enantiomer of a chiral compound. Advantageously, two enantiomers of the same compound differ in affinity to the single-enantiomer stationary phase. Thus, the use of a chiral stationary phase results in a high enantiomeric purity of the N-monofluoroalkyl tropane of formula (VI), preferably an enantiomeric purity of at least 99:1, more preferably at least 99.5:0.5. Preferably, the chiral stationary phase consists of cellulose or amylose based material.

In embodiments, the mobile phase is an organic solvent, preferably at least one organic solvent selected from the group comprising alkanes, chloroalkanes and alkylamines.

In further embodiments, the method according to the invention further comprises the steps preparation of a trialkyltin tropane of formula (VII)

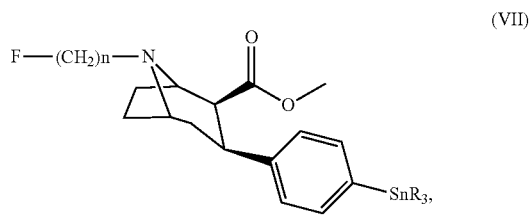
(VII)

wherein n is 2, 3 or 4, wherein R is each a C1 to C4 alkyl group, preferably a methyl or butyl group, more preferably a methyl group, and/or preparation of an iodinated and/or radioiodinated tropane of formula (VIII)

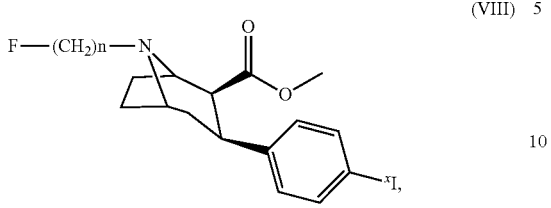

wherein n is 2, 3 or 4, wherein $^xI$ is at least one iodine isotope, preferably $^{123}I$ or $^{124}I$; and/or the preparation of a pharmaceutical composition, preferably the method according to the invention further comprises the steps preparation of a trialkyltin tropane of formula (VII) and the preparation of an iodinated and/or radioiodinated tropane of formula (VIII).

According to the invention, each R is independently selected from a C1 to C4 alkyl group. Preferably, all three R substituents are the same. As used herein, the term "C1 to C4 alkyl group" refers to a methyl, ethyl, propyl or butyl group.

The present invention further comprises a method for the preparation of a trialkyltin tropane of formula (VII)

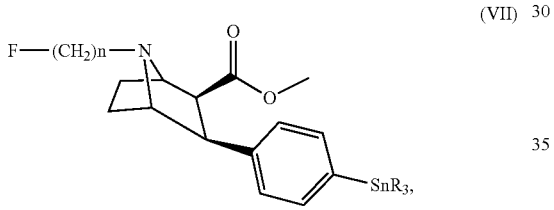

wherein n is 2, 3 or 4,
wherein R is each a C1 to C4 alkyl group, preferably a methyl or butyl group, more preferably a methyl group, comprising the steps:
i) carrying out the method of one of the claims 1 to 9 to give the N-monofluoroalkyl tropane of formula (VI),
ii) reaction of the compound of formula (VI) from step (i) with $Sn_2R_6$ in the presence of at least one catalyst to give the trialkyltin tropane of formula (VII), wherein R is each a C1 to C4 alkyl group, preferably a methyl or butyl group, more preferably a methyl group.

The present invention further comprises a method for the preparation of an iodinated and/or radioiodinated tropane of formula (VIII)

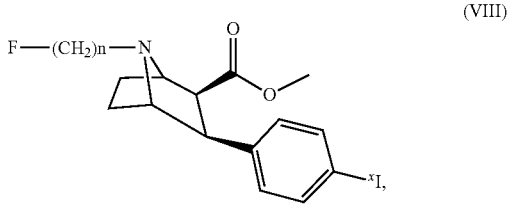

wherein n is 2, 3 or 4,
wherein $^xI$ is at least one iodine isotope, preferably $^{123}I$ or $^{124}I$ and/or $^{127}I$, more preferably $^{123}I$ or $^{124}I$, comprising the steps:
(1) carrying out the method of one of the claims 1 to 9 to give the N-monofluoroalkyl tropane of formula (VI),
(2) carrying out the method of claim 10 to give the trialkyltin tropane of formula (VII),
(3) reacting the trialkyltin tropane of formula (VII) from step (2) with a supply of $^xI$ in the presence of at least one oxidizing agent to give the iodinated and/or radioiodinated tropane of formula (VIII),
wherein $^xI$ is at least one iodine isotope, preferably $^{123}I$ or $^{124}I$ and/or $^{127}I$, more preferably $^{123}I$ or $^{124}I$.

In embodiments, $^xI$ is $^{123}I$ or $^{124}I$ or a mixture of $^{123}I$ and $^{127}I$ or a mixture of $^{124}I$ and $^{127}I$. Preferably, $^xI$ is $^{123}I$.

In further embodiments, the method for the preparation of an iodinated and/or radioiodinated tropane of formula (VIII) further comprises the preparation of a pharmaceutical composition.

In embodiments, the pharmaceutical composition comprises a pharmaceutically acceptable dilution agent or carrier. Preferably, the pharmaceutical composition is present in a form suitable for intravenous administration.

As a carrier, preferably water, buffered water, 0.9% saline solution, glycine solution and similar solvents are used. The solutions are sterile. The pharmaceutical compositions are sterilized by conventional well-known techniques. The compositions contain preferably pharmaceutically acceptable excipients, for example, those that are required in order to provide approximately physiological conditions and/or to increase the stability, such as agents for adjusting the pH value and buffering agents, preferably selected from sodium acetate, sodium chloride, sodium citrate, potassium phosphate, potassium chloride, calcium chloride, sodium lactate and histidine.

Pharmaceutical compositions must be sterile and stable under the manufacturing and storage conditions. The composition can be formulated as a solution, microemulsion, dispersion, in liposomes or in other ordered structures that are suitable for this purpose and known by the artesian.

In preferred embodiments, the pharmaceutical composition comprises a mixture of iodinated and radioiodinated tropane of formula (VIII), wherein $^xI$ is $^{123}I$ and $^{127}I$.

The dose of the iodinated and radioiodinated tropane of formula (VIII) in the pharmaceutical composition is preferably 0.07 µg/ml to 0.13 µg/ml.

Although the invention describes various dosages, it will be understood by one skilled in the art that the specific dose level and frequency of dosage for any particular subject may be varied and will depend upon a variety of factors. These factors include the age, body weight, general health, sex, diet, mode and time of administration, rate of excretion, drug combination, and the host undergoing diagnosis. Generally, however, dosage will approximate that which is typical for known methods of administration of the specific compound. In embodiments, a typical dosage of the radioiodinated tropane of formula (VIII) will be in the range of 111 MBq to 185 MBq $^{123}I$. Another aspect of the invention is the use of the N-monofluoroalkyl tropane of formula (VI)

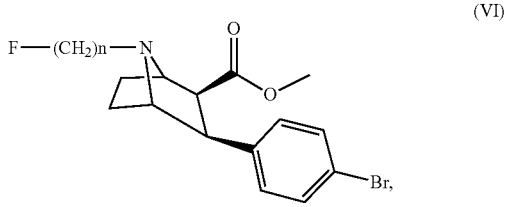

wherein n is 2, 3 or 4;
as a precursor in a method for the preparation of the trialkyltin tropane of formula (VII)

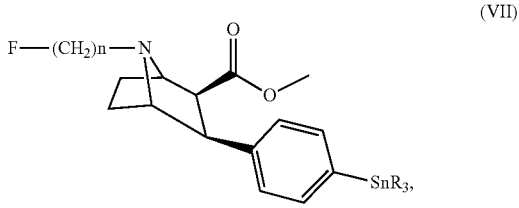

wherein R is each a C1 to C4 alkyl group, preferably a methyl or butyl group, more preferably a methyl group; and/or the iodinated and/or radioiodinated tropane of formula (VII)

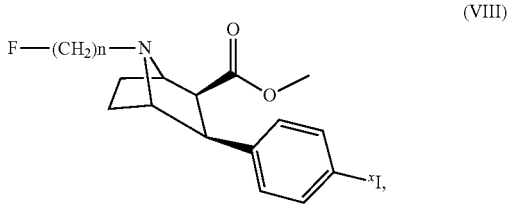

wherein $^xI$ is at least one iodine isotope, preferably $^{123}I$, $^{124}I$ and/or $^{127}I$, more preferably $^{123}I$ or $^{124}I$.

The N-monofluoroalkyl tropane of formula (VI) is more suitable as precursor for the synthesis of the trialkyltin tropane of formula (VII) and/or the iodinated and/or radioiodinated tropane of formula (VIII) than the corresponding iodide compound.

Preferably, the N-monofluoroalkyl tropane of formula (VI) is used as a precursor for use in the diagnosis of Parkinson's disease.

In embodiments, the N-monofluoroalkyl tropane of formula (VI) comprising diastereomers, enantiomers and/or tautomers is used as precursor in a method for the preparation of the trialkyltin tropane of formula (VII) and/or the iodinated and/or radioiodinated tropane of formula (VIII). Preferably, the N-monofluoroalkyl tropane of formula (VI) is used as precursor in a method for the preparation of the trialkyltin tropane of formula (VII) and/or the iodinated and/or radioiodinated tropane of formula (VIII) with a purity of at least 98% ee, more preferably at least 99% ee.

A further aspect of the invention is a method of diagnosing Parkinson's disease comprising the administration of the radioiodinated and optionally iodinated tropane of formula (VIII) prepared by the method according to the invention, preferably by administration of the iodinated and radioiodinated tropane of formula (VIII) or by administration of the radioiodinated tropane of formula (VIII).

In embodiments, the method of diagnosing Parkinson's disease is carried out by the following steps:
a) carrying out the method according to the invention to give the N-monofluoroalkyl tropane of formula (VI),
b) reaction of the compound of formula (VI) from step a) with $Sn_2R_6$ in the presence of at least one catalyst to give the trialkyltin tropane of formula (VII), wherein R is each a C1 to C4 alkyl group,
c) reacting the trialkyltin tropane of formula (VII) from step b) with a supply of $^xI$ in the presence of at least one oxidizing agent to give the radioiodinated and optionally the iodinated tropane of formula (VIII), wherein $^xI$ is at least one iodine isotope, preferably $^{123}I$ or $^{124}I$ and optionally $^{127}I$, more preferably $^{123}I$ or $^{124}I$,
d) administration of the radioiodinated and optionally the iodinated tropane of formula (VIII) to a subject.

In embodiments, the method of diagnosing Parkinson's disease comprises the administration of a pharmaceutical composition of the radioiodinated and optionally the iodinated tropane of formula (VIII) in step d).

In further embodiments, the radioiodinated tropane of formula (VIII) is administered in an effective amount.

In embodiments, the subject is a mammal, preferably a human.

In embodiments, the pharmaceutical composition is administered systemically. As used herein, "systemic administration" or "administered systemically" refers to pharmaceutical compositions that are introduced into the blood stream of a subject, and travel throughout the body of the subject to reach the part of the subject's body in need of diagnosis at an effective dose before being degraded by metabolism and excreted. Systemic administration of pharmaceutical compositions can be achieved by injection.

The pharmaceutical compositions are preferably administered parenterally, particularly preferred intravenously. In one embodiment of the invention, the parenteral pharmaceutical composition exists in an administration form that is suitable for injection. Particularly preferred compositions are therefore solutions, emulsions, or suspensions of the radioiodinated tropane of formula (VIII) present in a pharmaceutically acceptable dilution agent or carrier.

In a further embodiment, the recently described embodiments can be combined. Various changes and modifications within the spirit and scope of the disclosed invention will become readily apparent to those skilled in the art from reading the description and the other parts of the present disclosure.

The present invention will now be further explained by the following non-limiting figures and examples.

FIG. 1: $^1H$ NMR spectrum of methyl 8-methyl-8-azabicyclo[3.2.1]oct-2-ene-2-carboxylate (III) in $CDCl_3$. The signed chemical shifts mark residual solvent.

Figure 2:
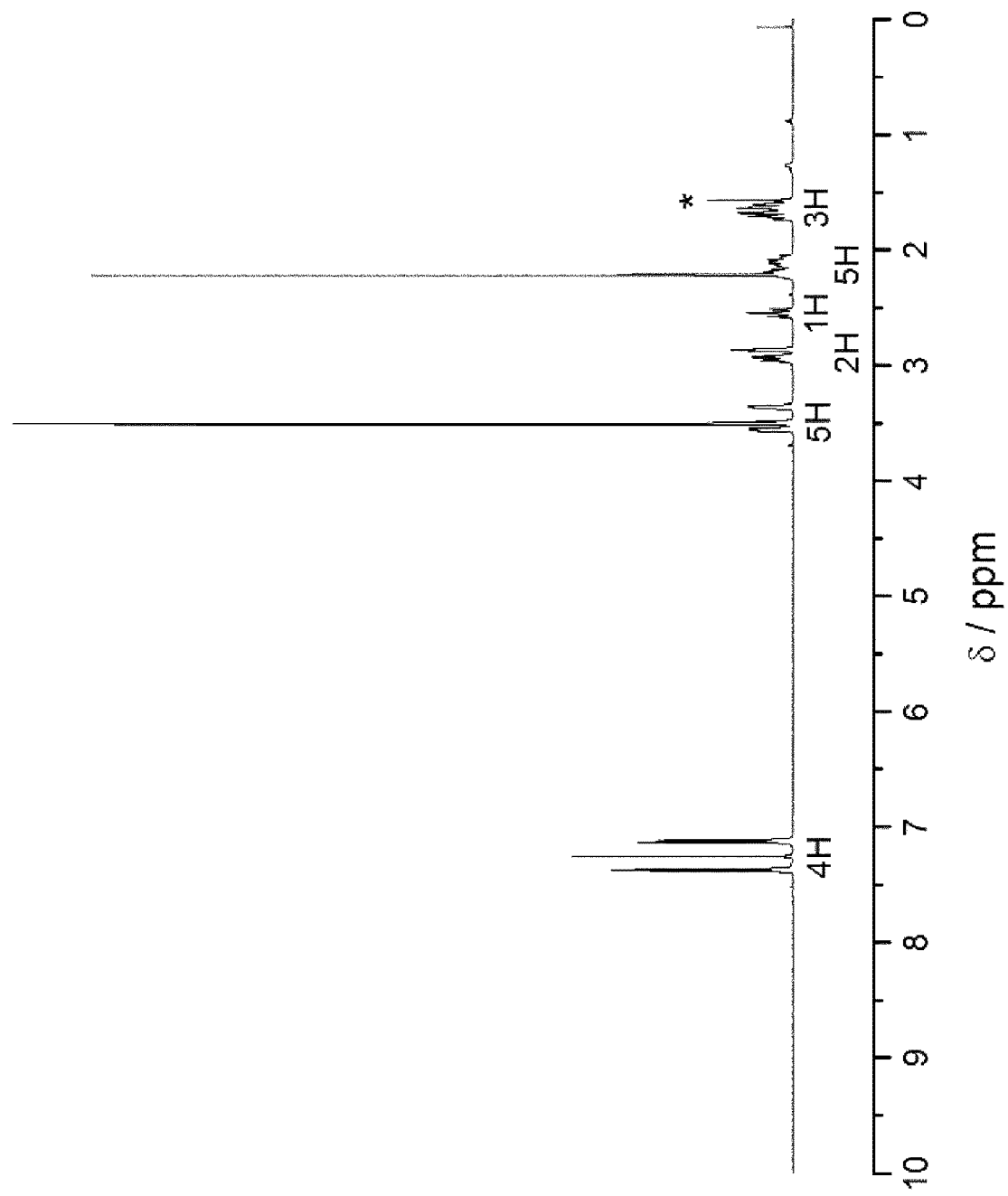

FIG. 2: $^1H$ NMR spectrum of methyl 3-(4-bromophenyl)-8-methyl-8-azabicyclo[3.2.1]octane carboxylate (IV) in $CDCl_3$. The asterisk marks water.

Figure 3:
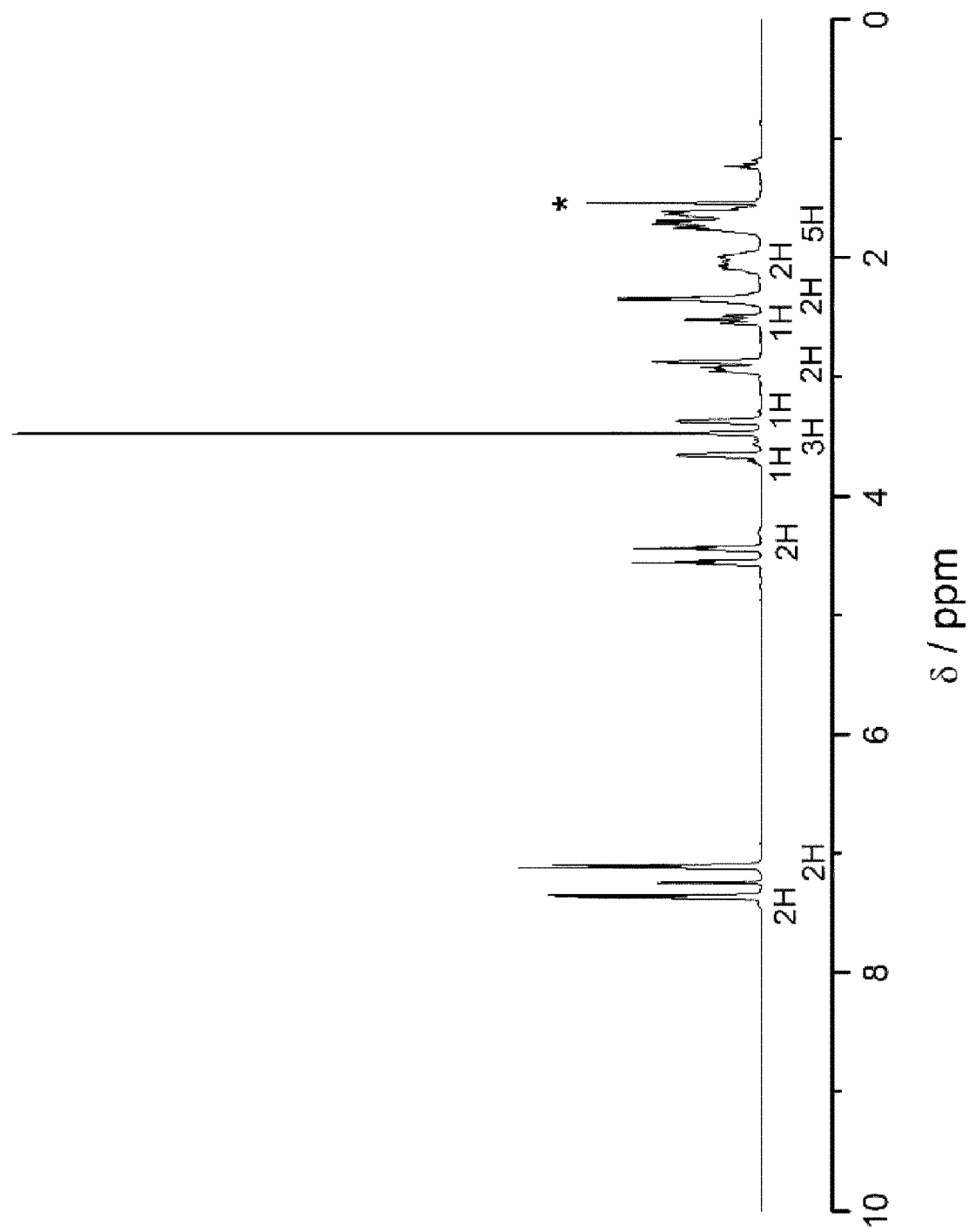

FIG. 3: $^1H$ NMR spectrum of (1R,2S,3S,5S)-methyl 3-(4-bromophenyl)-8-(3-fluoropropyl) azabicyclo[3.2.1]octane-2-carboxylate (VI) in $CDCl_3$. The asterisk marks water.

Figure 4:
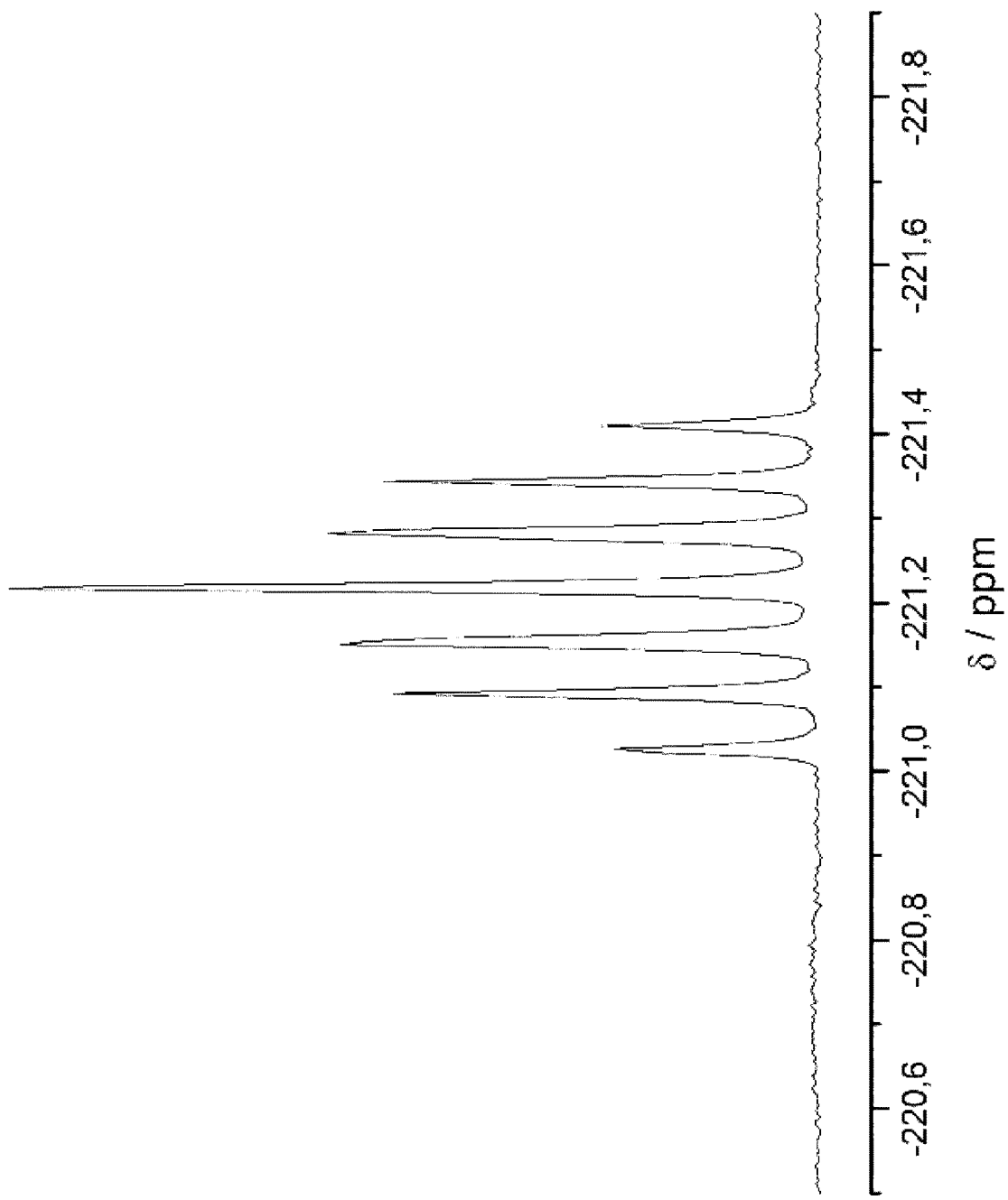

FIG. 4: $^{19}F$ NMR spectrum of (1R,2S,3S,5S)-methyl 3-(4-bromophenyl)-8-(3-fluoropropyl)-8-azabicyclo[3.2.1]octane-2-carboxylate (VI) in $CDCl_3$.

Figure 5:
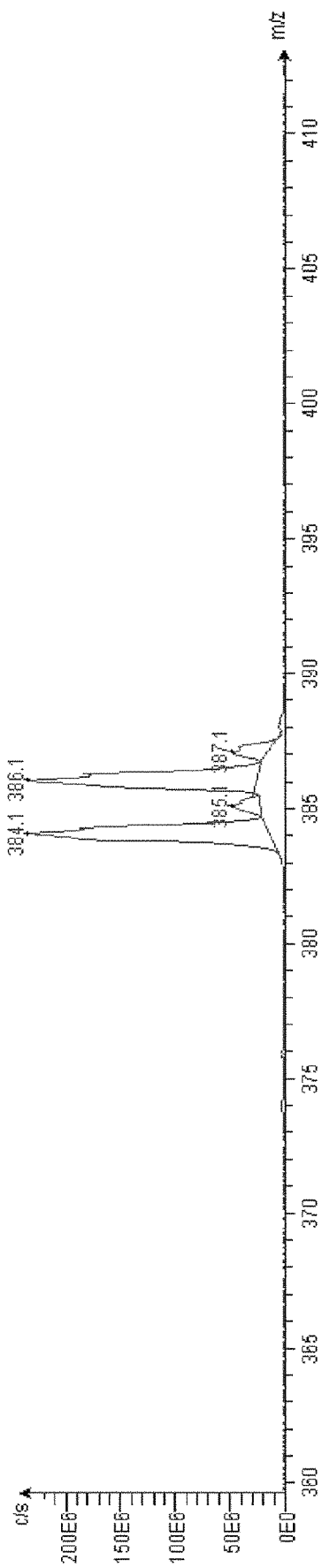

FIG. 5: ESI-MS of (1R,2S,3S,5S)-methyl 3-(4-bromophenyl)-8-(3-fluoropropyl)-8-azabicyclo-[3.2.1]octane-2-carboxylate (VI).

Figure 6:
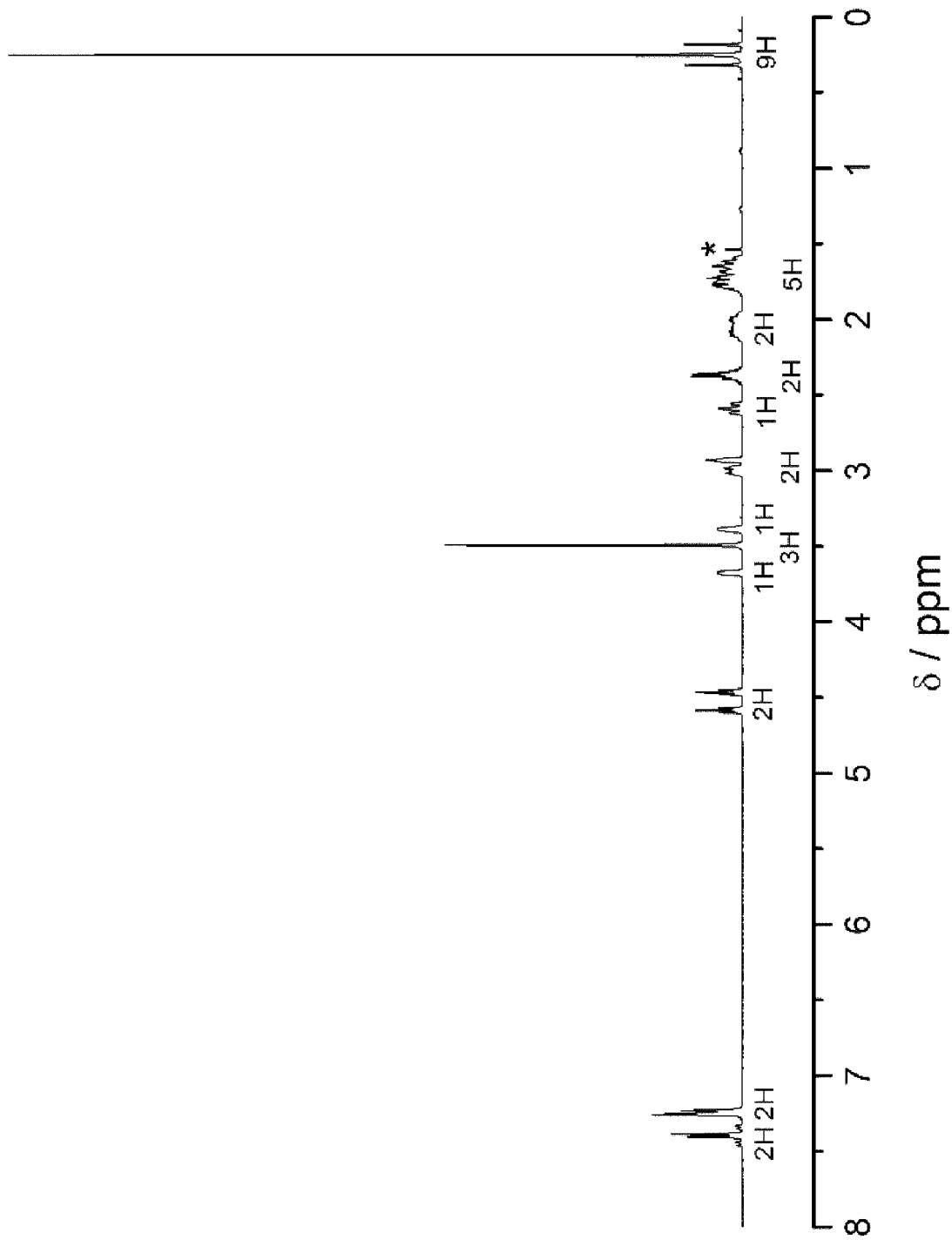

FIG. 6: $^1$H NMR spectrum of (1R,2S,3S,5S)-methyl 8-(3-fluoropropyl)-3-[4-(trimethylstannyl)-phenyl]-8-azabicyclo[3.2.1]octane-2-carboxylate (VI) in CDCl$_3$. The asterisk marks water.

Figure 7:
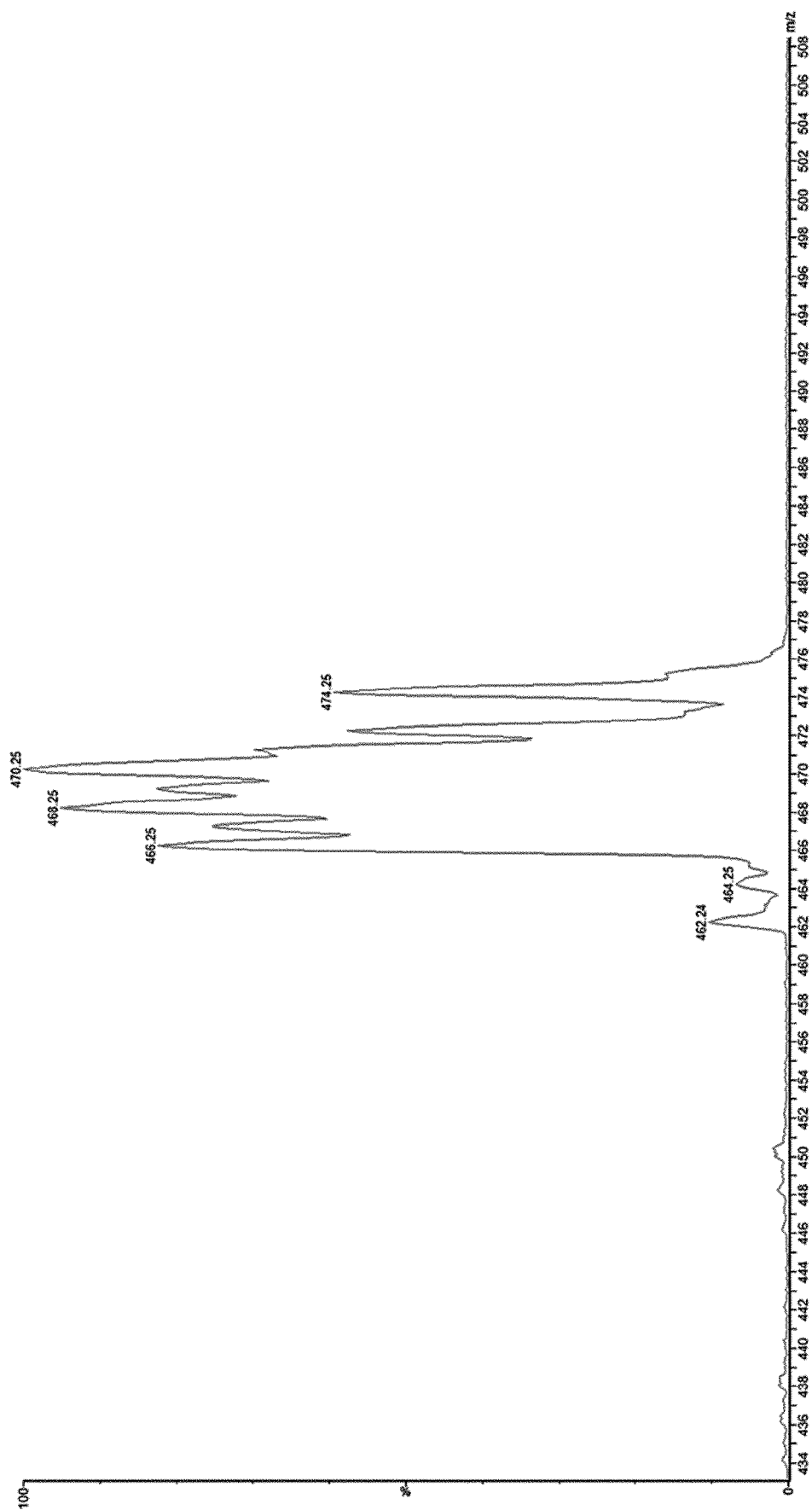

FIG. 7: ESI-MS of (1R,2S,3S,5S)-methyl 8-(3-fluoropropyl)-3-[4-(trimethylstannyl)phenyl]-8-azabicyclo[3.2.1]octane-2-carboxylate (VII).

Example 1: Synthesis of 2-Carbomethoxytropinone (I, Methyl 8-Methyl-3-Oxo-8-Azabicyclo[3.2.1]Octane-4-Carboxylate)

Under argon atmosphere, a solution of dimethyl carbonate (2.2 eq.) in cyclohexane is added to sodium hydride (2 eq.) and heated up to 70° C. After slowly addition of a tropinone (1 eq.) solution in cyclohexane, the temperature is increased to reflux. The suspension is refluxed under argon atmosphere for 30 min and then a catalytic amount of methanol is added carefully. Afterwards, the reaction mixture is refluxed for 4 h. After cooling to room temperature, the suspension is quenched and extracted using an aqueous solution of ammonium chloride. The cyclohexane phase is additionally extracted using water. Then the aqueous phase is extracted several times with chloroform. The combined chloroform phases are dried using magnesium sulfate and filtered. Rotary evaporator leads to a brown, oily product.

Yield: 89%

Example 2: Synthesis of Methyl 3-Hydroxy-8-Methyl-8-Azabicyclo[3.2.1]Octane-2-Carboxylate (II)

The synthesized 2-carbomethoxytropinone (I, 1 eq.) is directly used in the synthesis of (II). Therefore, 2-carbomethoxytropinone is dissolved in methanol and cooled to ≤30° C., after which sodium borohydride (3 eq.) is added. After reaction the mixture is slowly warmed up and added to ammonium chloride. Rotary evaporator leads to a yellow suspension, which is taken up in water. Subsequently, concentrated ammonia is used to basify the mixture. Afterwards, the mixture is extracted with chloroform. The combined organic phases are dried using magnesium sulfate and filtered. Rotary evaporator leads to an oily residue.

Yield: 87%

Example 3: Synthesis of Methyl 8-Methyl-8-Azabicyclo[3.2.1]Oct-2-Ene-2-Carboxylate (III)

Dimethyl aminopyridine (0.02 eq.) and triethylamine (2.9 eq.) are added to a solution of methyl 3-hydroxy-8-methyl-8-azabicyclo[3.2.1]octane-2-carboxylate (II; 1 eq.) in dichlormethane. The reaction mixture is cooled down (≤-30° C.) and trifluoroacetic anhydride (1.3 eq.) is added dropwise. After stirring at room temperature (>72 hours), an aqueous potassium carbonate solution is added. The mixture is extracted with chloroform for several times. The combined organic phases are dried over magnesium sulfate, filtered and concentrated using rotary evaporator. The residue is extracted two times by a mixture of n-hexane, chloroform and magnesium sulfate and then filtered, respectively. The combined extracts are concentrated using rotary evaporator. Purification of the crude product is performed by column chromatography under basic conditions. The product fractions are concentrated using rotary evaporator. The product is characterized by $^1$H NMR spectroscopy.

Yield: 33%

$^1$H NMR (400.0 MHz, CDCl$_3$, 298 K): δ 1.50 (m, 1H), 1.82 (m, 2H), 2.15 (m, 2H), 2.34 (s, 3H), 2.62 (d, 1H), 3.23 (t, 1H), 3.73 (s, 3H), 3.78 (d, 1H), 6.81 ppm (t, 1H).

Example 4: Synthesis of Methyl 3-(4-Bromophenyl)-8-Methyl-8-Azabicyclo[3.2.1]Octane-2-Carboxylate (IV)

Under argon atmosphere 1,4-dibromobenzene (2.1 eq.) is dissolved in dried diethyl ether and stirred, while magnesium (2 eq.) is added under argon flow. The mixture is heated at reflux and stirred for 1 hrs. Afterwards, the reaction mixture is cooled down to -45° C. and a solution of methyl 8-methyl-8-azabicyclo[3.2.1]oct-2-ene-2-carboxylate (III, 1 eq.) in dichloromethane is added dropwise. After stirring for ≥3 hours at -45° C., the reaction mixture is quenched with a solution of trifluoroacetic acid (2.1 eq.) in dichloromethane at -78° C. After complete addition, the reaction mixture is slowly warmed up by stirring in the cooling bath. A 1N hydrochloric acid is added to the reaction mixture and stirred for 15 min, whereby the pH is <2. The acidic aqueous phase is washed with diethyl ether. Afterwards, concentrated ammonia is used to basify the aqueous phase, which is then extracted with dichloromethane several times. The combined organic phase is dried using magnesium sulfate, filtered and concentrated using rotary evaporator. Purification of the crude product is performed by column chromatography under basic conditions. The product fractions are concentrated using rotary evaporator. Final purification is performed by crystallization. The colourless solid is isolated and dried in vacuum. The product is characterised by $^1$H NMR spectroscopy.

Yield: 40%

$^1$H NMR (400.0 MHz, CDCl$_3$, 298 K): δ 1.66 (m, 3H), 2.15 (m, 5H), 2.55 (t, 1H), 2.87 (t, 1H), 2.94 (m, 1H), 3.36 (m, 1H), 3.50 (s, 3H), 3.56 (m, 1H), 7.13 (d, 2H), 7.38 ppm (d, 2H)

Example 5: Synthesis of Methyl 3-(4-Bromophenyl)-8-Azabicyclo[3.2.1]Octane-2-Carboxylate (V)

Under argon atmosphere methyl 3-(4-bromophenyl)-8-methyl-8-azabicyclo[3.2.1]octane-2-carboxylate (IV, 1 eq.) is dissolved in dried 1,2-dichloroethane and 1-chloroethyl chloroformate (4 eq.) is added. The solution is stirred for 16 hours at reflux. Then, the second portion of 1-chloroethyl chloroformate (1 eq.) is added and the solution is refluxed for one hour. After cooling to room temperature, the solvent is removed using rotary evaporator. The residue is dissolved in methanol and stirred for 2 hours at reflux. After evaporation of the solvent, a saturated aqueous sodium hydrogen carbonate solution is added, and the aqueous phase is extracted with dichloromethane several times. The combined organic phase is dried using magnesium sulfate, filtered and concentrated using rotary evaporator.

Yield: Quantitative

Example 6: Synthesis of (1R,2S,3S,5S)-Methyl 3-(4-Bromophenyl)-8-(3-Fluoropropyl)-8-Azabicyclo[3.2.1]Octane-2-Carboxylate (VI)

Potassium carbonate (2.2 eq.) is added to a solution of methyl 3-(4-bromophenyl)-8-azabicyclo[3.2.1]octane-2-carboxylate (V, 1 eq.) in acetonitrile and stirred for 5 min. 1-Bromo-3-fluoropropane (1.2 eq.) is added and stirred for 3 hours at reflux after which the second portion of 1-bromo-3-fluoropropane (0.12 eq.) is added and stirred for an additional time of 1 hour at reflux. After cooling to room temperature water is added and the aqueous phase is extracted with ethyl acetate. The combined organic phase is dried using magnesium sulfate, filtered and concentrated using rotary evaporator. Purification of the crude product is performed by column chromatography under basic conditions. The product fractions are concentrated using rotary evaporator. Final purification is performed by crystallization. The colorless solid is isolated and dried in vacuum.

Yield: 70%

The racemic resolution is performed with preparative HPLC. The oily enantiomeric pure product is solidified by crystallization. The product is characterized by $^1$H NMR and $^{19}$F NMR spectroscopy, melting point, HPLC for ee-value, mass spectrometry as well as qNMR.

Yield: 72%

$^1$H NMR (400.0 MHz, CDCl$_3$, 298 K): δ 1.70 (m, 5H), 2.05 (m, 2H), 2.37 (m, 2H), 2.54 (t, 1H), 2.89 (s, 1H), 2.96 (m, 1H), 3.38 ppm (s, 1H), 3.49 (s, 3H), 3.68 (s, 1H), 4.52 (dt, 2H), 7.13 (d, 2H), 7.38 ppm (d, 2H);

$^{19}$F NMR (376.3 MHz, CDCl$_3$, 298 K): δ–221.2 ppm;

ESI-MS: m/z=384, 386;

m.p. 86° C.;

ee-value by HPLC: 100%;

assay determined by qNMR: 99.7%

Example 7: Synthesis of (1R,2S,3S,5S)-Methyl 8-(3-Fluoropropyl)-3-[4-(Trimethylstannyl)Phenyl]-8-Azabicyclo[3.2.1]Octane-2-Carboxylate (VII)

Under argon atmosphere, hexamethylditin (1.9 eq.) dissolved in toluene (45±5 mL·g$^{-1}$) is added to a solution of methyl 3-(4-bromophenyl)-8-(3-fluoropropyl)-8-azabicyclo [3.2.1]octane-2-carboxylate (VI, 1 eq.) in toluene (25±5 mL·g$^{-1}$). To the resulting mixture, tetrakis(triphenyl-phosphine)palladium(0) (0.18 eq.) is added and the solution is refluxed for at least one hour. The reaction mixture is cooled to room temperature and then filtered, whereby the resulting solution is concentrated using rotary evaporator. The crude product is purified by preparative HPLC under basic conditions. Subsequently, the fractions containing the target compound are dried in vacuum using rotary evaporator and then dried by lyophilization, whereby a colorless oil is obtained.

Yield: 15% to 40%

$^1$H NMR (400.0 MHz, CDCl$_3$, 298 K): δ 0.25 (s, 9H), 1.70 (m, 5H), 2.05 (m, 2H), 2.37 (m, 2H), 2.59 (dt, 1H), 2.93 (m, 1H), 3.00 (m, 1H), 3.39 ppm (m, 1H), 3.49 (s, 3H), 3.67 (m, 1H), 4.52 (dt, 2H), 7.24 (d, 2H), 7.40 ppm (d, 2H);

$^{19}$F NMR (376.3 MHz, CDCl$_3$, 298 K): δ–221.1 ppm;

ESI-MS: m/z=466, 468, 470;

ee-value by HPLC: 100%

Example 8: Synthesis of (1R,2S,3S,5S)-Methyl 8-(3-Fluoropropyl)-3-(4-[$^{123}$ I]Iodophenyl)-8-Azabicyclo[3.2.1]Octane-2-Carboxylate (VIII)

The alkaline solution of [$^{123}$I]iodide is transferred from the concentration unit to the reaction vessel. The pH value is adjusted and the carrier added by the addition of [$^{127}$I] iodide solved in phosphate buffer (total amount of iodide varies). Subsequently, (1R,2S,3S,5S)-methyl 8-(3-fluoropropyl)-3-[4-(trimethylstannyl)phenyl]-8-azabicyclo[3.2.1] octane-2-carboxylate (VII, 1 eq.) dissolved in ethanol and chloramine-T (55 eq.) dissolved in water for injection (WFI) are added consecutively to the reaction vessel. The reaction mixture is stirred at 30° C. for ≥1 minute. Afterwards, sodium metabisulfite (279 eq.) dissolved in water is added to the reaction vessel and stirred. Purification is performed using preparative HPLC. The product fraction is isolated, formulated and then portioned into vials.

CITED NON-PATENT LITERATURE

Carrol F I, Lewin A H, Abraham P, Parham K, Boja J W, Kuhar M J (1991) Synthesis and Ligand Binding of Cocaine Isomers at the Cocaine Receptor. J. Med. Chem. 34, 2719-2725.

Findlay S P (1957) Concerning 2-Carbomethoxytropinone. Contribution from the National Institute of Arthritis and Metabolic Diseases, National Institutes of Health, Public Health Service, U. S. Department of Health, Education and Welfare. 22, 1385-1394.

Gu X-H, Zong R, Kula N S, Baldessarini R J, Neumeyer J L (2001) Synthesis and biological evaluation of a series of novel N- or O-fluoroalkyl derivatives of tropane: potential positron emission tomography (PET) imaging agents for the dopamine transporter, BIOORGANIC & MEDICINAL CHEMISTRY LETTERS 11 (23), 3049-3053.

Majewski M, Lazny R (1995) Synthesis of Tropane Alkaloids via Enantioselective Deprotonation of Tropinone. J. Org. Chem. 60, 5825-5830.

Meltzer P C, Liang A Y, Brownell A-L, Elmaleh D R, Madras B K (1993) Substituted 3-Phenyltropane Analogs of Cocaine: Synthesis, Inhibition of Binding at Cocaine Recognition Sites, and Positron Emission Tomography Imaging. J. Med. Chem. 36, 855-862.

Neumeyer J L, Wang S, Gao Y, Milius R A, Kula N S, Campbell A, Baldessarini R J, Zea-Ponce Y, Baldwin R M, Innis R B (1994)N-ω-Fluoroalkyl Analogs of (1R)-2β-Carbomethoxy-3β-(4-iodophenyl)-tropane (β-CIT): Radiotracers for Positron Emission Tomography and Single Photon Emission Computed Tomography Imaging of Dopamine Transporters, JOURNAL OF MEDICINAL CHEMISTRY 37 (11), 1558-1561.

Niznik H B, Fogel E F, Fassos F F, Seeman P (1991) The Dopamine Transporter Is Absent in Parkinsonian Putamen and Reduced in the Caudate Nucleus. J. Neurochem. 56, 192.

Rami-Mark C, Bornat B, Fink C, Otter P, Ungersboeck J, Vraka C, Haeusler D, Nics L, Spreitzer H, Hacker M, Mitterhauser M, Wadsak W (2013) Synthesis, radiosynthesis and first in vitro evaluation of novel PET-tracers for the dopamine transporter: [$^{11}$c]IPCIT and [$^{18}$F] FE@IPCIT. BIOORGANIC & MEDICINAL CHEMISTRY 21 (24), 7562-7569.

Suwijn S R, van Boheemen C J M, de Haan R J, Tissingh G, Booij J, de Bie R M A (2015) The diagnostic accuracy of dopamine transporter SPECT imaging to detect nigrostriatal cell loss in patients with Parkinson's disease or clinically uncertain parkinsonism: a systematic review. EJNMMI Research. 5, 12.

Thompson P E, Hearn M T W (1997) Fmoc-protected Tropane-based Amino Acids for Peptide Structure-Function Studies, TETRAHEDRON LETTERS 38 (16), 2907-2910.

Zou M-F, Kopajtic T, Katz J L, Wirtz S, Justice J B, Newman A H (2001) Novel Tropane-Based Irreversible Ligands for the Dopamine Transporter. J. Med. Chem. 44, 4453-4461.

The invention claimed is:

1. A method for the preparation of an N-monofluoroalkyl tropane of formula (VI)

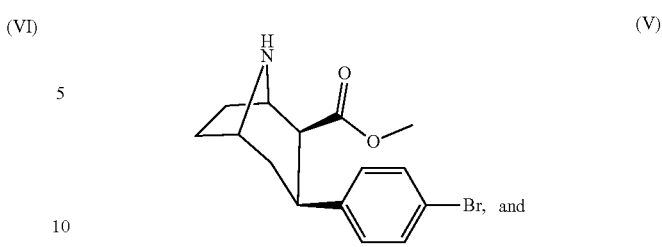

wherein n is 2, 3 or 4, comprising the steps:

a) providing a compound of formula (I)

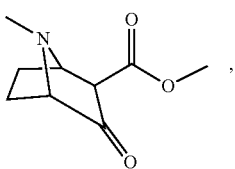

b) reducing the carbonyl group to a hydroxyl group to give the compound of formula (II)

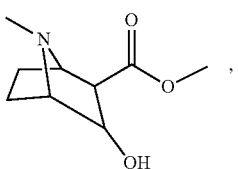

c) performing a dehydration reaction to give the compound of formula (III)

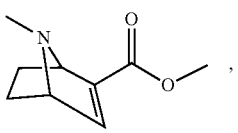

d) performing addition of a 4-bromophenyl moiety to give the compound of formula (IV)

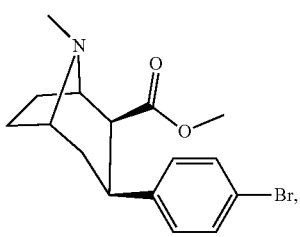

e) performing N-demethylation to give the compound of formula (V)

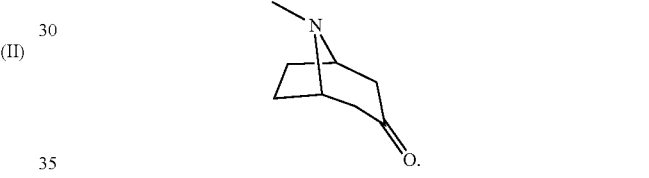

f) performing alkylation with an alkylation agent of formula F—(CH$_2$)$_n$—Br in the presence of a base to give the N-monofluoroalkyl tropane of formula (VI), wherein n is 2, 3 or 4, the method comprising one chiral resolution, wherein the chiral resolution is performed after the alkylation in step f), to separate enantiomers and provide the N-monofluoroalkyl tropane of formula (VI).

2. The method of claim 1, wherein compound of formula (I) is provided according to step a) by addition of a carbomethoxy group in 2-position to a 3-tropinone according to formula (Ia)

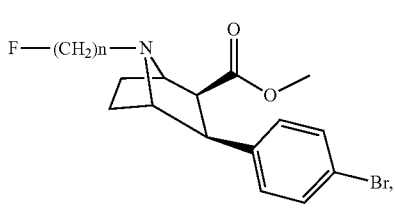

3. The method of claim 1, wherein the reducing of the carbonyl group to a hydroxyl group according to step b) is carried out using at least one reducing agent selected from hydrogen or sodium borohydride.

4. The method of claim 1, wherein the dehydration reaction according to step c) is carried out using a reagent selected from the group consisting of: phosphoryl chloride; hydrochloric acid; hydrobromic acid; and 4-Dimethylaminopyridine, triethylamine and trifluoroacetic anhydride.

5. The method of claim 1, wherein the addition of a 4-bromophenyl moiety according to step d) is carried out by an organometallic reaction.

6. The method of claim 1, wherein the N-demethylation according to step e) is carried out using chloroethyl chloroformates or 2,2,2-Trichloroethoxycarbonyl chloride, Zinc and acetic acid.

7. The method of claim 1, wherein the base in step f) is potassium carbonate.

8. The method of claim 1, wherein the N-monofluoroalkyl tropane of formula (VI) has an enantiomeric purity of at least 99:1.

9. The method of claim 1, wherein the chiral resolution is carried out by high-pressure liquid chromatography (HPLC) using a chiral stationary phase.

10. A method for the preparation of a trialkyltin tropane of formula (VII)

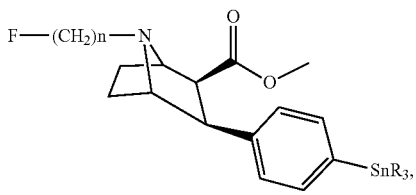

(VII)

wherein n is 2, 3 or 4,
wherein R is a C1 to C4 alkyl group,
comprising the steps:
  i) carrying out the method of claim 1 to give the N-monofluoroalkyl tropane of formula (VI),
  ii) reacting the compound of formula (VI) from step (i) with $Sn_2R_6$ in the presence of at least one catalyst to give the trialkyltin tropane of formula (VII), wherein R is a C1 to C4 alkyl group.

11. A method for the preparation of an iodinated and/or radioiodinated tropane of formula (VIII)

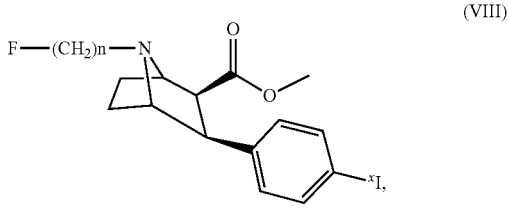

(VIII)

wherein n is 2, 3 or 4,
wherein $^xI$ is at least one iodine isotope,
comprising the steps:
  (1) carrying out the method of claim 1 to give the N-monofluoroalkyl tropane of formula (VI),
  (2) preparing a trialkyltin tropane of formula (VII),

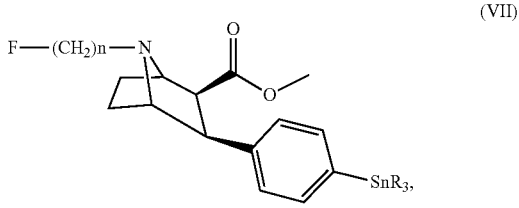

(VII)

wherein n is 2, 3 or 4,
wherein R is a C1 to C4 alkyl group,
  comprising reaction of the compound of formula (VI) from step (1) with $Sn_2R_6$ in the presence of at least one catalyst to give the trialkyltin tropane of formula (VII), wherein R is a C1 to C4 alkyl group,
  (3) reacting the trialkyltin tropane of formula (VII) from step (2) with a supply of $^xI$ in the presence of at least one oxidizing agent to give the iodinated and/or radioiodinated tropane of formula (VIII),
wherein $^xI$ is at least one iodine isotope.

12. The method of claim 11, wherein $^xI$ is $^{123}I$.

13. The method of claim 11, further comprising preparation of a pharmaceutical composition.

14. The method of claim 2, wherein the reducing of the carbonyl group to a hydroxyl group according to step b) is carried out using at least one reducing agent selected from hydrogen or sodium borohydride.

15. The method of claim 14, wherein the dehydration reaction according to step c) is carried out using a reagent selected from the group consisting of: phosphoryl chloride; hydrochloric acid; hydrobromic acid; and 4-Dimethylaminopyridine, triethylamine and trifluoroacetic anhydride.

16. The method of claim 15, wherein the addition of a 4-bromophenyl moiety according to step d) is carried out by an organometallic reaction.

17. The method of claim 16, wherein the N-demethylation according to step e) is carried out using chloroethyl chloroformates or 2,2,2-Trichloroethoxycarbonyl chloride, Zinc and acetic acid.

18. The method of claim 17, wherein the base in step f) is potassium carbonate.

19. The method of claim 1 wherein the chiral resolution is carried out by high-pressure liquid chromatography (HPLC) using a chiral stationary phase, and wherein the N-monofluoroalkyl tropane of formula (VI) has an enantiomeric purity of at least 99.5:0.5.

* * * * *